UNITED STATES PATENT OFFICE.

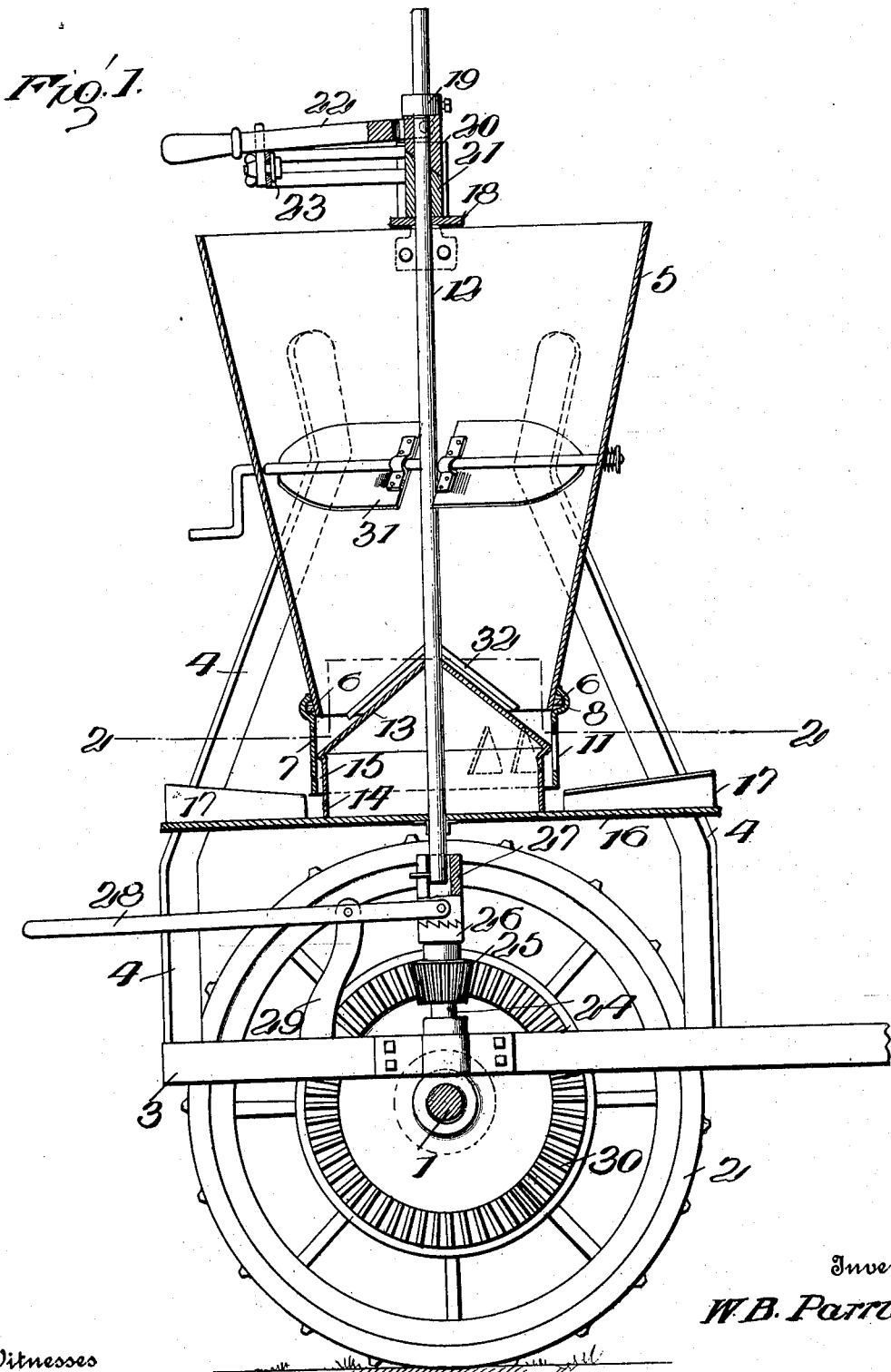

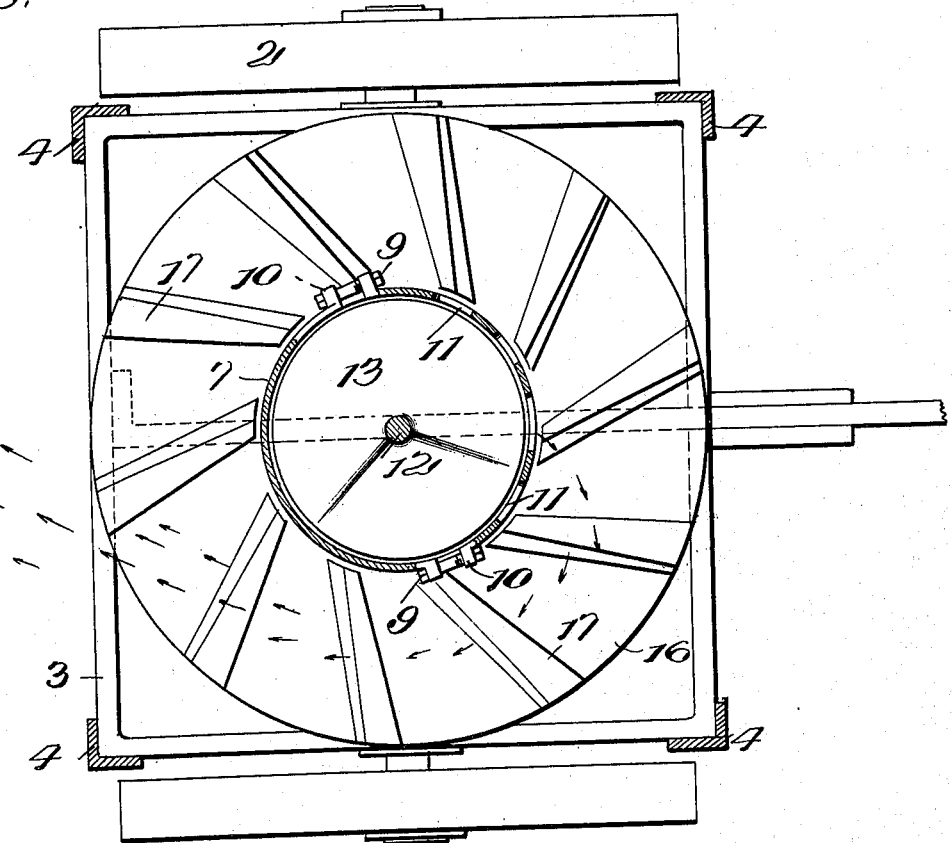
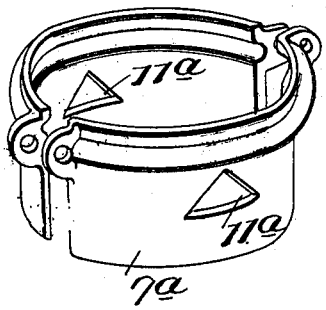
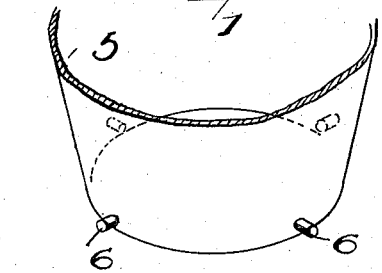
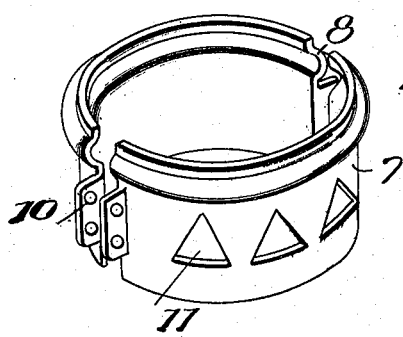

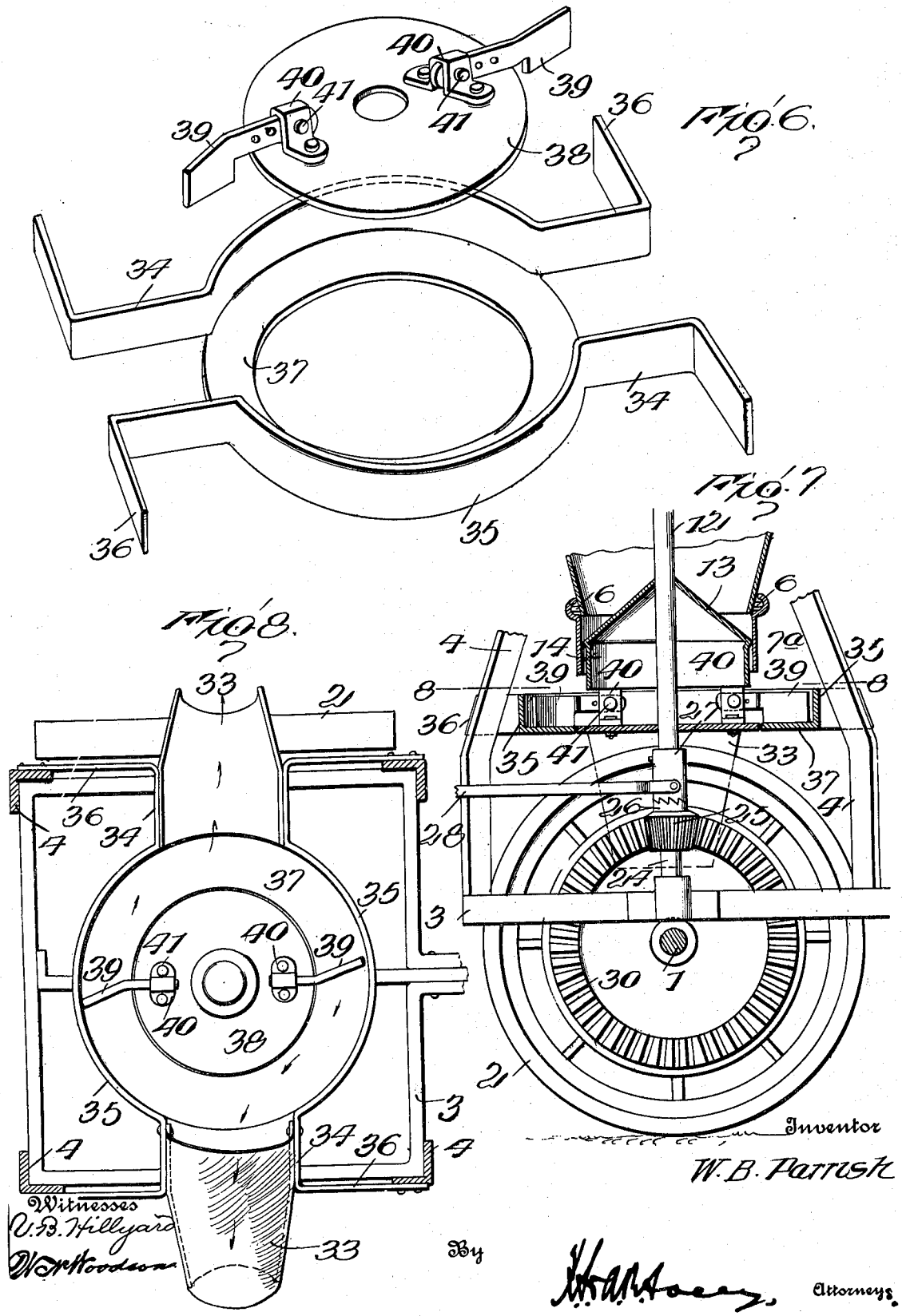

WASHINGTON B. PARRISH, OF KENBRIDGE, VIRGINIA.

SEED AND FERTILIZER DISTRIBUTER.

1,166,477.  Specification of Letters Patent.  Patented Jan. 4, 1916.

Application filed March 16, 1915.  Serial No. 14,686.

*To all whom it may concern:*

Be it known that I, WASHINGTON B. PARRISH, a citizen of the United States, residing at Kenbridge, in the county of Lunenburg and State of Virginia, have invented certain new and useful Improvements in Seed and Fertilizer Distributers, of which the following is a specification.

This invention relates to a machine to be impelled over the field in any suitable manner and at the same time to sow seed or distribute fertilizer or like material either broadcast or in rows according to the nature of the plants to be supplied with fertilizer for nourishment.

The invention has for its object to devise means of peculiar structural arrangement, to admit of directing the delivery of the seed or fertilizer whereby in the event of the machine being drawn over the field the seed or fertilizer will not be delivered in such a manner as to strike the animal and produce discomfort or cause fright.

A further purpose of the invention is to devise novel means whereby the amount of seed to be sowed or the quantity of fertilizer to be distributed to a given surface may be regulated.

A further purpose of the invention is to provide for proper adjustment of the delivery and to admit of throwing the mechanism into and out of gear without requiring the machine to be stopped and also to admit of the turning of the machine at the end of the row without any waste of seed or fertilizer while making the turn preliminary to recrossing the field.

The invention, furthermore, provides for the ready adaptation of the machine for delivering fertilizer in parallel rows as when it is required to supply plaster to adjacent rows of peanuts.

With the foregoing objects in view and such others as will readily suggest themselves to those skilled in the art it is to be understood that in adapting the invention to special requirement, various changes in the form, proportion and minor details of construction may be resorted to without departing from the invention as disclosed and hereinafter claimed.

In the drawings hereto attached, Figure 1 is a vertical central longitudinal section of a machine for sowing seed and distributing fertilizer constructed with and embodying the essential features of the invention; Fig. 2 is a horizontal section on the line 2—2 of Fig. 1; Fig. 3 is a detail perspective view of the lower portion of the hopper; Fig. 4 is a detail perspective view of the delivery section which has adjustable connection with the lower portion of the hopper; Fig. 5 is a modified form of the delivery section of the hopper; Fig. 6 is a detail perspective view of the means for deliverying the material in parallel rows; Fig. 7 is a sectional view showing the machine adapted for deliverying the material in parallel rows; Fig. 8 is a horizontal section on the line 8—8 of Fig. 7.

Corresponding and like parts are referred to in the following description and indicated in all the views of the drawings by the same reference characters.

The machine embodies a suitable framework adapted to receive and support the working parts and which in turn is mounted upon an axle 1 and ground wheels 2. This framework comprises a horizontal rectangular frame 3 and a plurality of uprights 4, the latter being disposed at the corners of the horizontal frame 3 and having their upper portions converging and attached to a hopper 5 which is of tapering form and is provided at its lower end with a plurality of outwardly extending studs 6. The hopper 5 is disposed vertically and is elevated some distance above the horizontal frame 3. A section 7 is fitted to the lower end of the hopper and is adjustable circularly to admit of the delivery of the contents of the hopper being made in any desired angular direction. The adjustable section 7 of the hopper is retained in place by means of the studs 6 and a channel portion 8 near the upper edge of the section formed by pressing the same outward. The section 7 is of annular form and depends from the body of the hopper and is adapted to be secured in the adjusted position. As illustrated the section 7 is adapted to be contracted so as to grip the lower portion of the hopper in a manner to hold the section in the adjusted position. The section 7 is formed of parts which are adapted to be connected by means of bolts or fastenings 9 which pass through openings formed in offstanding parts 10 formed at the ends of the parts. When the fastenings 9 are loose the section 7 may be turned to any position with reference to the hopper so as to deliver the material in any direction. The outlet is formed in the section 7 and may consist of a plurality of openings 11 closely related, as shown most clearly in Fig. 4 or may comprise opposed openings 11ª, as indicated in Fig. 5. The section 7 is placed in position when the machine is adapted for broadcast delivery. The section 7ª indicated in Fig. 5 is substituted for the section 7 when the machine is adapted for delivery of the material in parallel rows. The section 7ª is not unlike in construction to the section 7 and is adjustable about the lower end of the body of the hopper and retained in the adjusted position by fastening means in substantially the same manner as the section 7.

A vertical shaft 12 passes centrally through the hopper and is suitably journaled near its upper and lower ends. A cone 13 is secured to the lower portion of the shaft 12 to move therewith. The cone 13 constitutes in effect a bottom to the hopper and is adapted to direct the contents of the hopper outwardly through the discharge. By moving the cone 13 vertically the discharge of the hopper may be covered to a greater or less extent thereby regulating the amount of seed to be sowed or fertilizer or plaster to be delivered to a given area of ground. It is observed that the discharge openings 11 and 11ª are made tapering and arranged with their apexes pointing upward, hence vertical adjustment of the cone results in varying the size of the discharge. A skirt or rim 14 depending from the outer edge of the cone 13 is set inward a short distance from such outer edge, thereby leaving an annular clearance space 15 between the section 7 and such skirt for the escape of any dust or other matter finding its way between the parts 7 and 14. A spreader or distributer is attached to the lower edge of the skirt 14 and to the shaft 12 so as to move with such parts. The spreader comprises a circular plate or disk 16 and blades 17; the latter being arranged upon the upper side of the disk and having an approximate tangential disposition. The blades 17 flare outwardly from their inner ends and are curved between their longitudinal edges and are arranged with their open or hollow sides facing in the direction of rotation of the spreader. Any suitable means may be provided for adjusting the shaft 12 vertically. The upper portion of the shaft 12 passes through a cross piece 18 at the upper end of the hopper and a set collar 19 is secured to the shaft 12 a short distance above the cross piece 18. Collars 20 and 21 are mounted upon the shaft between the set collar 19 and cross piece 18 and have their opposing ends inclined. The collar 21 is fixed whereas the collar 20 is rotatable. A lever 22 is connected with the collar 20 and when turned causes the collar 20 to ride upon the inclined end of the collar 21 and thereby move the shaft 12 vertically to the required distance so as to regulate the delivery of the contents from the hopper. A curved bar 23 coöperates with the lever 22 and may be suitably graduated to indicate the amount of material to be delivered according to a given area of ground.

A short shaft 24 is mounted at its lower end in a suitable bearing applied to the frame 3. A pinion 25 is secured to the shaft 24 so as to rotate therewith. A half clutch 26 is likewise connected with the shaft 24. A sleeve 27 is suitably splined to the lower end of the shaft 12 and is formed at its lower end with teeth to engage the teeth of the half clutch 26 so as to cause both shafts 24 and 12 to rotate in unison. The construction is such as to admit of vertical adjustment of the shaft 12 without disconnecting the clutch members and the clutch may be disconnected without disturbing the adjustment of the shaft 12. A lever 28 fulcrumed upon a standard 29 is connected with the sleeve 27 and provides convenient means for operating the clutch when it is desired to throw the mechanism into or out of clutched engagement with the driver. The lever 28 may be operated by hand or foot as found most convenient. A gear wheel 30 secured to the axle 1 is in mesh with the pinion 25 and constitutes the driver.

The seed to be sowed or the fertilizer to be distributed is placed in the hopper 5 and the shaft 12 is adjusted vertically to deliver the required amount to the given area. The machine is propelled over the ground either by hitching the same to a wagon or attaching a draft animal thereto and as the machine advances rotary movement is imparted to the shaft 12, cone 13 and spreader or distributer. The material passes through the lateral discharge of the section 7 and is scattered or distributed broadcast by means of the rotary spreader. To prevent banking of the contents of the hopper, dampers 31 are located therein and fingers 32 are attached to the shaft 12 and constitute an agitator. The section 7 is turned to effect delivery in the required direction. In the event of the delivery being required in parallel rows instead of broadcast as when it is desired to deliver plaster to rows of peanuts, the section 7 is replaced by the section 7ª and the attachment shown most clearly in Figs. 6 and 8 not placed in position.

The attachment comprises oppositely disposed spouts 33 which are arranged to deliver the plaster or other material laterally in parallel rows. The spouts 33 are attached to a frame which comprises similar bars 34 which have their middle portions oppositely curved, as indicated at 35, and their terminal portions oppositely bent, as indicated at 36, and attached to the uprights 4. A ring 37 is secured to the oppositely curved portions 35 of the bars 34 and is disposed in a horizontal plane. A disk 38 is attached to the shaft 24 so as to rotate therewith and is provided with oppositely disposed sweeps 39 which have their outer ends rearwardly bent and arranged to travel over the ring 37. The sweeps 39 are adjustably connected to the disk 38 by means of keepers 40 and pins 41, the latter passing through transverse openings formed in the side members of the keepers and in the shanks of the sweeps 39.

When the machine is adapted for parallel row delivery the section 7ª is properly adjusted upon the lower end of the hopper 5. The plaster or other material is discharged through the openings 11ª upon the ring 37 and is caught by the sweeps 39 and brushed from such ring into the spouts 33 and directed by such spouts to the rows at opposite sides of the machine. The amount of the plaster or other material to be delivered to a unit of area is regulated by vertical adjustment of the cone 13 in the manner hereinbefore stated.

From the foregoing taken in connection with the accompanying drawings it will be understood that the invention provides a machine which may be readily adjusted for distributing seed, fertilizer or the like broadcast or in parallel rows and in regulated quantity according to the amount to be supplied to a given area. It is also understood that the machine is capable of a variety of work and that within the scope of the appended claims various changes in the form, proportion and minor details of construction may be resorted to in the embodiment of the invention without departing from the essential features thereof.

Having thus described the invention, what is claimed as new is:—

1. In a machine of the character described, the combination of a hopper provided with a lateral discharge of tapering form, a cone disposed within the lower portion of the hopper for directing the contents outwardly through the lateral discharge, and means for adjusting one of the parts vertically to cover the discharge more or less and regulating the delivery according to the amount to be supplied to a given area.

2. In a machine of the character described, the combination of a hopper, a section fitted to the lower end of the hopper and provided with a lateral discharge and adapted to be turned to effect delivery in any direction and a cone arranged within the hopper with its lower portion in the plane of the said section to direct the contents of the hopper laterally through the discharge of such section.

3. In a machine of the character specified, the combination of a hopper provided at or near its lower end with an outwardly projecting part, a section fitted to the lower end of the hopper and having a portion grooved to receive the outwardly projecting part of the hopper, said section having a lateral discharge, means for securing the section to the hopper in the adjusted position, and a cone arranged within the hopper and having its lower portion in the plane of the said section and adapted to direct the contents of the hopper through the lateral discharge thereof.

4. In a machine of the character set forth, the combination of a hopper, studs projecting outwardly from the lower end of the hopper, a section fitted to the lower portion of the hopper and having a portion grooved to receive the studs, said section having a lateral discharge, means for securing the section in the adjusted position, and a cone arranged within the hopper with its lower portion in the plane of the said section and adapted to direct the contents of the hopper through the discharge thereof.

5. In a machine of the character specified, the combination of a vertically disposed fixed hopper, a vertically adjustable shaft passing through the hopper, a member arranged within the hopper and connected with the shaft for movement therewith, a rotatable shaft in line with the adjustable shaft, a clutch member carried by the rotatable shaft, a second clutch member splined to the said adjustable shaft, and means for moving the second clutch member upon the adjustable shaft independently of the movement of said adjustable shaft.

6. In a machine of the character described, the combination of a fixed hopper, a section fitted to the lower end of the hopper and adapted to be turned thereon and provided with a lateral discharge, means for contracting the section about the hopper to secure it in the adjusted position, a cone arranged within the hopper and adapted to effect delivery of the contents of the hopper through the discharge of the section, and a delivering member having connection with the cone to rotate therewith.

7. In a machine of the character described, the combination of a hopper, a section fitted to the lower end of the hopper and having a lateral discharge and adapted to be turned for effecting delivery in the desired direction, a vertically adjustable shaft passing through the hopper, a cone attached to such shaft, and a delivering member having connection with the shaft.

8. In combination, a hopper having a lateral discharge, a horizontally disposed supporting member extending beyond the sides of the hopper to receive the discharge therefrom and formed with an outlet, a rotary member, and a sweep having adjustable connection with the rotary member and arranged to travel over the supporting member to brush the material therefrom through the outlet thereof.

9. In combination, a vertically disposed hopper having a lateral discharge, a ring supported horizontally to receive the discharge from the hopper, a rim at the outer edge of the ring and provided with a lateral outlet, a rotary member disposed about in the plane of the ring, and a sweep connected with the rotary member and adapted to travel over the ring to brush the material from the ring through the outlet of the rim.

10. In combination, a vertically disposed hopper, a ring disposed beneath the hopper, bars supporting the ring and having the middle portions oppositely curved, the ends of such bars being spaced apart to form an outlet, a rotary member and a sweep connected with the rotary member and adapted to travel over the ring to brush the material therefrom through the outlet.

In testimony whereof I affix my signature in presence of two witnesses.

WASHINGTON B. PARRISH.

Witnesses:
  D. T. KENNEDY,
  A. B. SHACKLETON.